US012792097B2

(12) United States Patent
Liu et al.

(10) Patent No.: US 12,792,097 B2
(45) Date of Patent: Nov. 10, 2026

(54) DISPLAY PANEL AND DISPLAY DEVICE HAVING SAME

(71) Applicant: BOE Technology Group Co., Ltd., Beijing (CN)

(72) Inventors: Yunjin Liu, Beijing (CN); Shuang Du, Beijing (CN); Paoming Tsai, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 446 days.

(21) Appl. No.: 18/026,289

(22) PCT Filed: Oct. 22, 2021

(86) PCT No.: PCT/CN2021/125634
§ 371 (c)(1),
(2) Date: Mar. 14, 2023

(87) PCT Pub. No.: WO2022/151789
PCT Pub. Date: Jul. 21, 2022

(65) Prior Publication Data

US 2023/0359248 A1 Nov. 9, 2023

(30) Foreign Application Priority Data

Jan. 15, 2021 (CN) ........................ 202110054330.9

(51) Int. Cl.
*G06F 1/16* (2006.01)
*B32B 3/12* (2006.01)
*B32B 15/082* (2006.01)
*B32B 27/08* (2006.01)
*B32B 27/30* (2006.01)
(Continued)

(52) U.S. Cl.
CPC .............. *G06F 1/1656* (2013.01); *B32B 3/12* (2013.01); *B32B 15/082* (2013.01); *B32B 27/08* (2013.01); *B32B 27/30* (2013.01); *B32B 15/18* (2013.01); *B32B 27/281* (2013.01); *B32B 27/36* (2013.01); *B32B 2307/51* (2013.01); *B32B 2307/7376* (2023.05); *B32B 2457/20* (2013.01); *G06F 1/1652* (2013.01)

(58) Field of Classification Search
None
See application file for complete search history.

(56) References Cited

U.S. PATENT DOCUMENTS

2016/0359138 A1* 12/2016 Ishiguro ............... H10K 59/873
2018/0373913 A1* 12/2018 Panchawagh .......... H10K 59/00

FOREIGN PATENT DOCUMENTS

CN 107067979 A 8/2017
CN 206610569 U 11/2017
(Continued)

OTHER PUBLICATIONS

PCT/CN2021/125634 international search report.
CN202110054330.9 first office action.

*Primary Examiner* — Anthony J Frost
(74) *Attorney, Agent, or Firm* — IPro, PLLC

(57) ABSTRACT

Provided is a display panel. The display panel includes: a cover plate, a screen film layer, and a buffer layer, wherein the buffer layer is arranged on a side, distal to the cover plate, of the screen film layer, and the buffer layer includes at least one buffer chamber.

14 Claims, 2 Drawing Sheets

(51) Int. Cl.
*B32B 15/18* (2006.01)
*B32B 27/28* (2006.01)
*B32B 27/36* (2006.01)

(56) References Cited

FOREIGN PATENT DOCUMENTS

| | | | | | |
|---|---|---|---|---|---|
| CN | 109036132 | A | * | 12/2018 | ............... G09F 9/33 |
| CN | 109036137 | A | | 12/2018 | |
| CN | 208284171 | U | | 12/2018 | |
| CN | 109119549 | A | | 1/2019 | |
| CN | 109148517 | A | | 1/2019 | |
| CN | 109148714 | A | | 1/2019 | |
| CN | 208622358 | U | * | 3/2019 | |
| CN | 107067979 | B | * | 5/2020 | ............. G09F 9/301 |
| CN | 112863348 | A | | 5/2021 | |

* cited by examiner

DISPLAY PANEL AND DISPLAY DEVICE HAVING SAME

CROSS REFERENCE TO RELATED APPLICATIONS

The present disclosure is a U.S. national stage of international application No. PCT/CN2021/125634, field on Oct. 22, 2021, which claims priority to the application No. 202110054330.9 filed on Jan. 15, 2021, entitled "DISPLAY PANEL AND DISPLAY DEVICE HAVING SAME," the contents of which are herein incorporated by reference in their entireties.

TECHNICAL FIELD

The present disclosure relates to the technical field of display screens, and in particular, relates to a display panel and a display device having the same.

BACKGROUND OF THE INVENTION

The conventional flexible display device is poor in impact resistance. Under an impact force, the display panel of the flexible display device is easily deformed and damaged, such that the service life of the flexible display device is greatly shortened. In addition, damage of the flexible display device also causes property loss to users.

SUMMARY OF THE INVENTION

According to some embodiments of the present disclosure, a display panel with good impact resistance is provided.

According to some embodiments of the present disclosure, a display device having the above display panel is provided.

The display panel according to the embodiments of the present disclosure includes a cover plate, a screen film layer, and a buffer layer, wherein the buffer layer is arranged on a side, distal to the cover plate, of the screen film layer, and the buffer layer is a buffer layer having at least one buffer chamber.

In the display panel according to the embodiments of the present disclosure, the buffer chambers are arranged in the buffer layer, such that the display panel has good impact resistance.

According to some embodiments of the present disclosure, the buffer layer includes a substrate and a buffer member arranged on the substrate, wherein the buffer member is disposed between the substrate and the screen film layer, and the buffer chambers are arranged in the buffer member.

According to some embodiments of the present disclosure, the substrate is made of polyimide or polyethylene terephthalate, and the substrate has a thickness of 50 μm to 100 μm.

According to some embodiments of the present disclosure, the substrate is made of stainless steel, and the substrate has a thickness of 30 μm to 50 μm.

According to some embodiments of the present disclosure, the buffer member is made of one or a combination of more of acrylic resin, silica gel, polyurethane, siloxane, and a boric acid-modified hydroxy-terminated polysiloxane-silica light impact-hardening polymer composite material.

According to some embodiments of the present disclosure, the buffer member has a thickness of 100 μm to 200 μm.

According to some embodiments of the present disclosure, the buffer member has an elasticity modulus of 30 KPa to 100 KPa.

According to some embodiments of the present disclosure, the buffer chamber is in a cross-sectional shape of one or a combination of a rectangle, a circle, and a rhombus.

According to some embodiments of the present disclosure, the buffer chambers are obtained by a laser cutting or die cutting process.

In another aspect, the display device according to the embodiments of the present disclosure includes the above display panel.

The advantages of the display device and the display panel are the same as those of the prior art, and are not repeated herein.

Additional aspects and advantages of the present disclosure will be set forth in part in the following description, and in part will be obvious from the following description, or will be learned by practice of the present disclosure.

REFERENCE NUMERALS AND DENOTATIONS THEREOF

Figure 1:
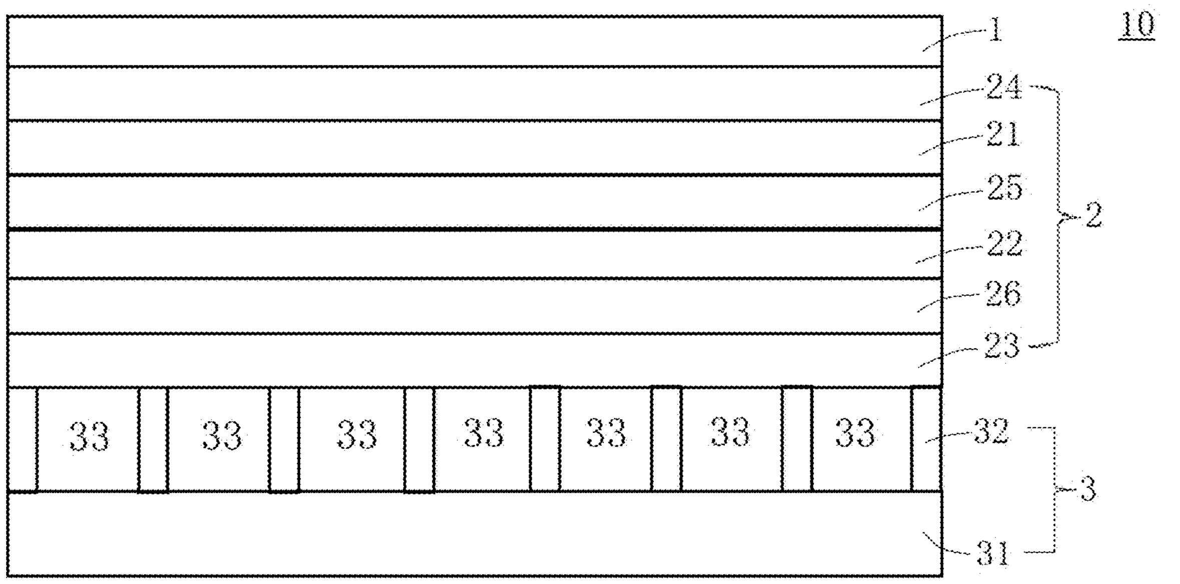
FIG. 1 is a schematic cross-sectional view of a display panel according to some embodiments of the present disclosure.

10—display panel, 1—cover plate, 2—screen film layer, 21—touch layer, 22—polarization layer, 23—support film layer, 24—first adhesive layer, 25—second adhesive layer, 26—display device, 3—buffer layer, 31—substrate, 32—buffer member, 321—first material layer, 322—second material layer, 323—third material layer, and 33—buffer chamber.

DETAILED DESCRIPTION

Embodiments of the present disclosure are described hereinafter in detail, examples of which are illustrated in the accompanying drawings, wherein the same or similar reference numerals indicate the same or similar elements or elements having the same or similar functions throughout. The embodiments described hereinafter with reference to the accompanying drawings are illustrative and intended to explain the present disclosure and should not be construed as limiting the present disclosure.

In the description of the present disclosure, it is to be understood that directions or positional relationships indicated by the terms "front surface," "back surface," "length," "width," "thickness," "upper," "lower," "front," "rear," "left," "right," "inner," "outer," and the like are those shown based on the accompanying drawings, are merely intended to facilitate and simplify description rather than to indicate or imply that the indicated apparatus or element must have a specific direction and be structured and operated according to the specific direction, and should not be construed as limiting the present disclosure.

In the present disclosure, unless otherwise clearly specified and defined, the terms "mounted," "connected," "fixed," and the like should be comprehended in its broad sense. For example, "connected" is "fixedly connect," "detachably connect" or "integrally connected as one;" "mechanically connect," "electrically connect," or "communicate with each other;" "directly interconnect" or "indirectly interconnect through an intermediate;" or "the communication between the interiors of two elements" or "the interaction between two elements." For those of ordinary skill in the art, the specific meanings of the above terms in the present disclosure are interpreted according to specific conditions.

The display panel 10 according to the embodiments of the present disclosure is described in detail below with reference to FIGS. 1 to 5.

Figure 2:
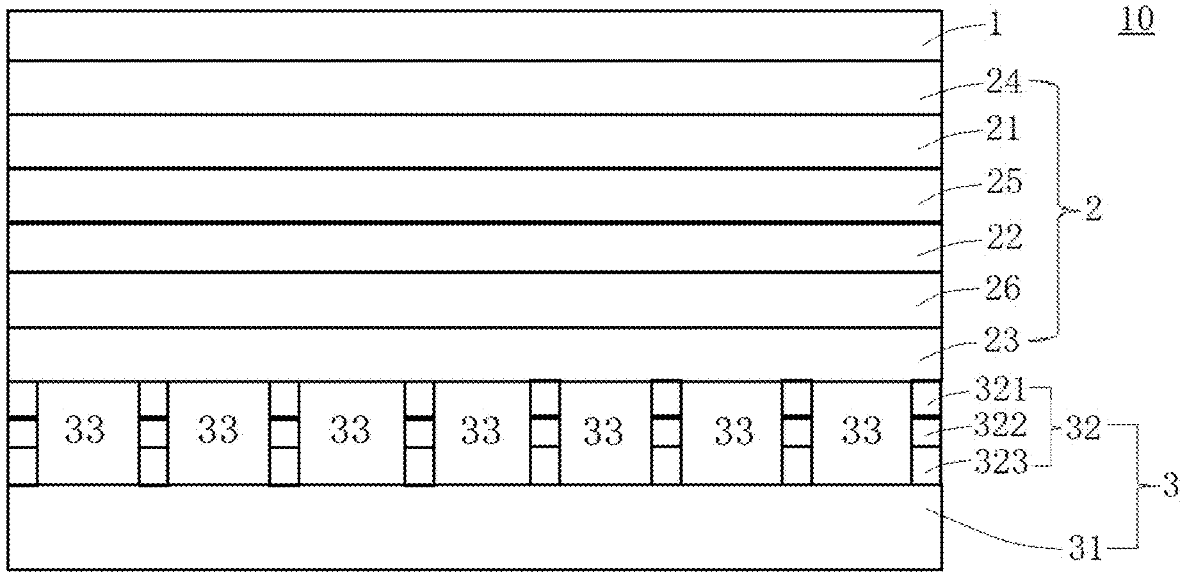
FIG. 2 is a schematic cross-sectional view of a display panel according to some embodiments of the present disclosure.
Figure 3:
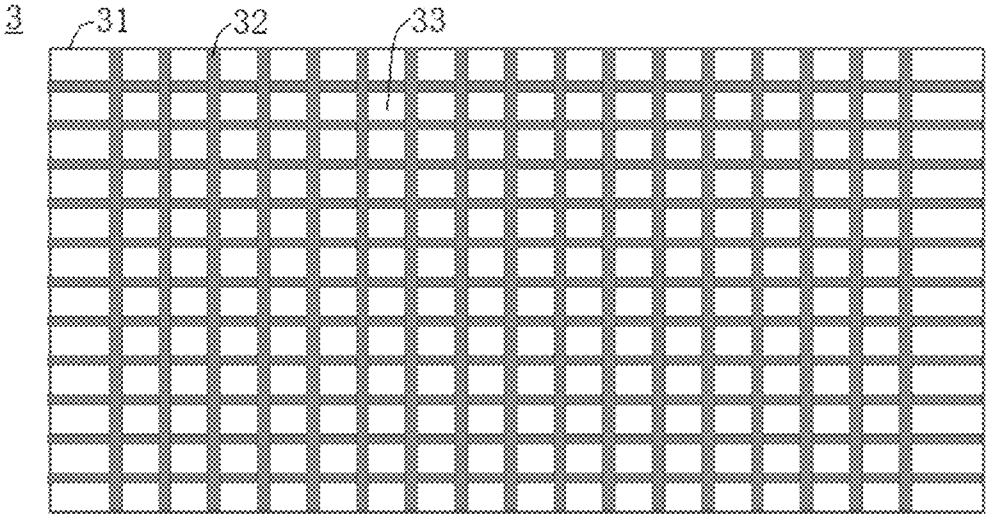
FIG. 3 is a top view of a buffer member and a substrate according to some embodiments of the present disclosure.

Referring to FIGS. 1 and 2, a display panel 10 according to the embodiments of the present disclosure includes a cover plate 1, a screen film layer 2, and a buffer layer 3. The buffer layer 3 is arranged on a side, distal to the cover plate 1, of the screen film layer 2. That is, the screen film layer 2 is arranged on a back surface of the cover plate 1, and the buffer layer 3 is arranged on a back surface of the screen film layer 2.

The screen film layer 2 includes a touch layer 21, a polarization layer 22, and a support film layer 23. The touch layer 21 is connected to the cover plate 1 via a first adhesive layer 24, the touch layer 21 is connected to the polarization layer 22 via a second adhesive layer 25, and a display device 26 is arranged between the polarization layer 22 and the support film layer 23.

The buffer layer 3 includes at least one buffer chamber 33. The buffer chamber 33 is equivalent to an airbag structure. The buffer chamber 33 is arranged in the buffer layer 3. In the case that the display panel 10 is subjected to an external impact force, the buffer chamber 33 ensures that the display panel 10 has a large deformation space, which allows deformation in a larger area to reduce the failure of the display device 26 or the breakage risk of the screen film layer 2 and to reduce the maximum localized deformation amount of the display device 26 in the screen film layer 2, such that the display panel 10 has good impact resistance, the display panel 10 resists a greater impact force, and the enhancement of the product quality of the display panel 10 is facilitated.

In the display panel 10 according to the embodiments of the present disclosure, the buffer chamber 33 is arranged in the buffer layer 3, such that the display panel 10 deforms in the buffer chambers 33 in response to being subjected to an impact force. The buffer layer 3 absorbs an impact energy in response to deforming in the buffer chambers 33, and thus the impact energy suffered by the display device 26 or the screen film layer 2 is reduced, and it is ensured that the display device 26 is not easy to damage and the screen film layer 2 is not easy to break. Therefore, the display panel 10 of the present disclosure has good impact resistance and resists a greater impact force, such that the display panel 10 is not easily deformed or damaged, the service life of the display panel 10 is prolonged greatly, and the property loss of users is reduced.

In the embodiments of FIGS. 1 and 2, the buffer layer 3 includes a substrate 31 and a buffer member 32 arranged on the substrate 31. The buffer member 32 is disposed between the substrate 31 and the screen film layer 2, and the buffer chamber 33 is arranged in the buffer member 32. The substrate 31 provides a supporting force for the buffer member 32, such that the buffer member 32 is held on the back surface of the screen film layer 2.

Optionally, the buffer member 32 is cured by ultraviolet (UV) rays to make the adhesive force of the buffer member 32 reach 1000-1200 gf/25 cm, and then the buffer member 32 is fixed to the screen film layer 2 through adhesion, thereby completing the molding process of the buffer layer 3 and the screen film layer 2.

In some embodiments of the present disclosure, the substrate 31 is made of polyimide (i.e., PI) or polyethylene terephthalate (i.e., PET), and the substrate 31 has a thickness of 50 μm to 100 μm, thereby ensuring that the substrate 31 provides a sufficient supporting force for the buffer member 32. The substrate 31 made of polyimide or polyethylene terephthalate, having a thickness of less than 50 μm, has small strength and rigidity, and thus a sufficient support force fails to be supplied to the buffer member 32. With a thickness of greater than 100 μm, the substrate 31 is thick, which is not favorable for the lightweighted and thin design of the display panel 10. Optionally, the substrate 31 has a thickness of 60 μm, 70 μm, 80 μm, 90 μm, or the like.

In some embodiments of the present disclosure, the substrate 31 is made of stainless steel, and the substrate 31 has a thickness of 30 μm to 50 μm. That is, in the case that the substrate 31 is made of stainless steel, even if the substrate 31 is thin, the substrate 31 has good strength and rigidity, and supplies a sufficient supporting force to the buffer member 32. Various grade specifications of the stainless substrate are present, for example, SUS301, SUS303, SUS304, and SUS316. For the stainless steel substrate, in the case that the substrate 31 made of stainless steel, having a thickness of less than 30 μm, has small strength and rigidity, and thus a sufficient support force fails to be supplied to the buffer member 32. In the case that the substrate 31 has a thickness of greater than 50 μm, the substrate 31 is thick, and the weight thereof is heavy, which is not favorable for the light and thin design of the display panel 10. Optionally, the substrate 31 has a thickness of 35 μm, 40 μm, 45 μm, or the like.

In some embodiments of the present disclosure, the buffer member 32 is made of one or a combination of more of acrylic resin (a generic name for a polymer of acrylic acid, methacrylic acid and derivatives thereof, such as commonly-used acrylic), silica gel, polyurethane (PU), siloxane, and a boric acid-modified hydroxy-terminated polysiloxane-silica light impact-hardening polymer composite material (i.e., P4U).

For example, in the embodiments of FIG. 1, the buffer member 32 is made of one of acrylic resin, silica gel, polyurethane, siloxane, and a boric acid-modified hydroxy-terminated polysiloxane-silica light impact-hardening polymer composite material.

In the embodiments of FIG. 2, the buffer member 32 is made of a combination of acrylic resin, silica gel, polyurethane, siloxane, and a boric acid-modified hydroxy-terminated polysiloxane-silica light impact-hardening polymer composite material.

Specifically, in the embodiments of FIG. 2, the buffer member 32 is of a composite structure, and the buffer member 32 includes a first material layer 321, a second material layer 322, and a third material layer 323. The second material layer 322 is disposed between the first material layer 321 and the third material layer 323. The first material layer 321, the second material layer 322, and the third material layer 323 is made of different materials, or, the first material layer 321 and the third material layer 323 are made of the same material while the second material layer 322 is made of another material. For example, in some embodiments, the first material layer 321 and the third material layer 323 are made of acrylic resin with an elasticity modulus of 30 KPa to 80 KPa, and the second material layer 322 is made of polyurethane with an elasticity modulus of 30 KPa to 60 KPa.

In the description of the present disclosure, it should be understood that the terms "first," "second," and the like are merely used for descriptive purposes only and should not be construed as indicating or implying the relative importance or as implicitly indicating the number of indicated technical features. Thus, features defined as "first," "second," and the like explicitly or implicitly include one or more of the features. In the description of the present disclosure, "a plurality of" refers to at least two, e.g., two or three, unless otherwise explicitly defined.

In some embodiments not shown, the buffer member 32 includes two layers, four layers, five layers or more. These layers are made of the same or different materials, and a single layer is made of a mixture of materials, which is not repeated herein.

In some embodiments of the present disclosure, the buffer member 32 has a thickness of 100 μm to 200 μm. In the case that the buffer member 32 has a thickness of less than 100 μm, the buffer chambers 33 is small, and a sufficient buffer capacity fails to be supplied to the buffer member 32. In the case that the buffer member 32 has a thickness of greater than 200 μm, the buffer member 32 is thick, which is not favorable for the light and thin design of the display panel 10. Optionally, the buffer member 32 has a thickness of 120 μm, 150 μm, 180 μm, or the like.

In some embodiments of the present disclosure, the buffer member 32 has an elasticity modulus of 30 KPa to 100 KPa, thereby ensuring that the buffer member 32 has good impact-buffer properties. In the case that the buffer member 32 has an elasticity modulus of less than 30 KPa, the buffer member 32 is hard, and the buffer capacity of the buffer member 32 is not obvious, and in the case that the display panel 10 is subjected to an impact force, the buffer member 32 cannot provide a good buffer force; in the case that the buffer member 32 has an elasticity modulus of greater than 100 KPa, the buffer member 32 is too soft, and in the case that the display panel 10 is not subjected to an impact force, the buffer member 32 fails to supply a good supporting force to the screen film layer 2.

In some embodiments of the present disclosure, the buffer chamber 33 is in a cross-sectional shape of one or a combination of more of a rectangle, a circle, and a rhombus. For example, in the embodiments of FIGS. 3 and 4, the buffer chamber 33 is in a cross-sectional shape of a rectangle with a length a of 3 mm to 10 mm and a width b of 3 mm to 10 mm, a being equal to b, such that the rectangular buffer chamber becomes a square buffer chamber. In the embodiments of FIG. 5, the buffer chamber 33 is in a cross-sectional shape of a rhombus. In some embodiments not shown, the buffer chamber 33 is in a cross-sectional shape of a circle or a combination of various shapes.

Figure 4:
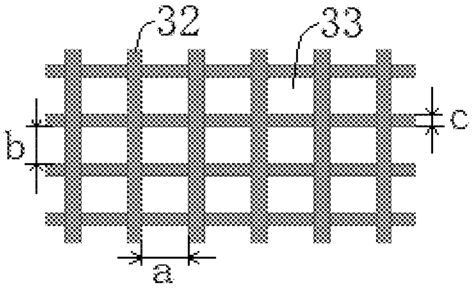
FIG. 4 is a partial schematic view of the buffer member of FIG. 3.
Figure 5:
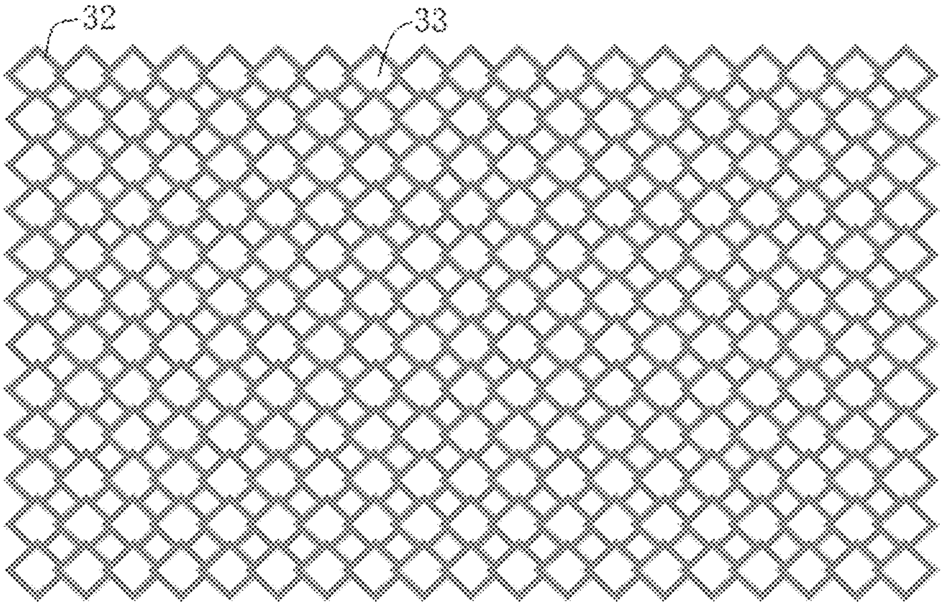
FIG. 5 is a top view of a buffer member according to some embodiments of the present disclosure.

Referring to FIG. 4, a partition wall between two adjacent buffer chambers 33 has a thickness c of 2 mm to 5 mm so as to ensure that the two adjacent buffer chambers 33 do not interfere with each other.

In some embodiments of the present disclosure, the buffer chambers 33 are fabricated by a laser cutting or die cutting process, wherein the laser cutting is picosecond laser or femtosecond laser.

In some embodiments, the substrate 31 is die-cut or chemically-etched to fabricate a desired size, and the buffer member 32 is attached to the surface of the substrate 31 and then laser-cut to fabricate the buffer chambers 33 in a desired shape.

In other embodiments, the substrate 31 is die-cut or chemically-etched to fabricate a desired size, and the buffer member 32 is die-cut to fabricate the buffer chambers 33 in a desired shape and then attached to the surface of the substrate 31.

The buffer layer 3 having the buffer chambers 33 is arranged on the back surface of the screen film layer 2, such that the display panel 10 has good impact resistance. For example, in a drop ball test, a drop ball height of the display panel 10 without any buffer layer 3 is significantly different from that of the display panel 10 having a buffer layer 3 with a different thickness, the drop ball height of the display panel 10 having the buffer layer 3 is significantly greater than that of the display panel 10 without the buffer layer 3, and the drop ball height of the display panel 10 in the case that the buffer layer 3 is thick is significantly greater than that of the display panel 10 in the case that the buffer layer 3 is thin. The detailed results are shown in Table 1:

TABLE 1

Drop ball test results

| Test item | Basic scheme | Comparative scheme 1 | Comparative scheme 2 |
|---|---|---|---|
| Thickness of buffer layer (μm) | 0 (i.e., without buffer layer) | 80-150 | 150-200 |
| Height of drop ball (cm) | 1.7 | 2.4 | 3.9 |

In another aspect, the display device according to the embodiments of the present disclosure includes the display panel 10 according to the above embodiments, since the buffer chambers 33 are arranged in the display panel 10, the display panel 10 has good impact resistance, such that the display device has good impact resistance.

In the description of the specification, the description referring to the terms "one embodiment," "some embodiments," "an example," "specific examples," "some examples," or the like means that specific features, structures, materials or characteristics described in connection with the embodiments or examples are included in at least one embodiment or example of the present disclosure. In the specification, the schematic representations of the above terms are not necessarily intended to refer to the same embodiment or example. In addition, the specific features, structures, materials or characteristics described are combined in any suitable manner in any one or more embodiments or examples. Moreover, various embodiments or examples described in the specification are combined by those skilled in the art.

While embodiments of the present disclosure have been shown and described above, it is to be understood that the above embodiments are exemplary and should not be construed as limiting the present disclosure and that changes, modifications, substitutions and variations in the above embodiments are made by those of ordinary skill in the art within the scope of the present disclosure.

The invention claimed is:

1. A display panel, comprising: a cover plate, a screen film layer, and a buffer layer, wherein the buffer layer is arranged on a side, distal to the cover plate, of the screen film layer, and the buffer layer comprises a plurality of buffer chambers;

wherein the buffer layer comprises a substrate and a buffer member arranged on the substrate, the buffer member is disposed between the substrate and the screen film layer, the plurality of buffer chambers are arranged in the buffer member and each of the plurality of buffer chambers runs through the buffer member and exposes a part of surface of the substrate;

wherein a partition wall is provided between any two adjacent buffer chambers; and wherein cross-sectional shapes of the plurality of buffer chambers and partition wall are all rectangular;

the buffer member is of a composite structure, and the buffer member comprises a first material layer, a second material layer and a third material layer, wherein the second material layer is disposed between the first material layer and the third material layer, a material of second material layer is different from that of the first material layer and that of the third material layer; and each buffer chamber extends through the first material layer, the second material layer and the third material layer.

2. The display panel according to claim 1, wherein the substrate is made of polyimide or polyethylene terephthalate, and the substrate has a thickness of 50 μm to 100 μm.

3. The display panel according to claim 1, wherein the substrate is made of stainless steel, and the substrate has a thickness of 30 μm to 50 μm.

4. The display panel according to claim 1, wherein the buffer member is made of one or a combination of acrylic resin, silica gel, polyurethane, siloxane, and a boric acid-modified hydroxy-terminated polysiloxane-silica light impact-hardening polymer composite material.

5. The display panel according to claim 1, wherein the buffer member has a thickness of 100 μm to 200 μm.

6. The display panel according to claim 1, wherein the buffer member has an elasticity modulus of 30 KPa to 100 KPa.

7. The display panel according to claim 1, wherein the buffer chamber is fabricated by a laser cutting or die cutting process.

8. A display device, comprising: a display panel;

wherein the display panel comprises: a cover plate, a screen film layer, and a buffer layer, wherein the buffer layer is arranged on a side, distal to the cover plate, of the screen film layer, and the buffer layer comprises a plurality of buffer chambers;

wherein the buffer layer comprises a substrate and a buffer member arranged on the substrate, the buffer member is disposed between the substrate and the screen film layer, the plurality of buffer chambers are arranged in the buffer member and each of the plurality of buffer chambers runs through the buffer member and exposes a part of surface of the substrate;

wherein a partition wall is provided between any two adjacent buffer chambers; and wherein cross-sectional shapes of the plurality of buffer chambers and partition wall are all rectangular;

the buffer member is of a composite structure, and the buffer member comprises a first material layer, a second material layer and a third material layer, wherein the second material layer is disposed between the first material layer and the third material layer, a material of second material layer is different from that of the first material layer and that of the third material layer; and each buffer chamber extends through the first material layer, the second material layer and the third material layer.

9. The display device according to claim 8, wherein the substrate is made of polyimide or polyethylene terephthalate, and the substrate has a thickness of 50 μm to 100 μm.

10. The display device according to claim 8, wherein the substrate is made of stainless steel, and the substrate has a thickness of 30 μm to 50 μm.

11. The display device according to claim 8, wherein the buffer member is made of one or a combination of acrylic resin, silica gel, polyurethane, siloxane, and a boric acid-modified hydroxy-terminated polysiloxane-silica light impact-hardening polymer composite material.

12. The display device according to claim 8, wherein the buffer member has a thickness of 100 μm to 200 μm.

13. The display device according to claim 8, wherein the buffer member has an elasticity modulus of 30 KPa to 100 KPa.

14. The display device according to claim 8, wherein the buffer chamber is fabricated by a laser cutting or die cutting process.

* * * * *